United States Patent
Jung et al.

(10) Patent No.: US 8,675,646 B2
(45) Date of Patent: *Mar. 18, 2014

(54) METHOD FOR ENCODING INFORMATION OBJECT AND ENCODER USING THE SAME

(75) Inventors: Hee-Won Jung, Gyeonggi-do (KR);
Jun-Ho Koh, Gyeonggi-do (KR);
Sang-Mook Lee, Gyeonggi-do (KR);
Gi-Sang Lee, Gyeonggi-do (KR);
Sergey Zhidkov, Izhevsk (RU)

(73) Assignee: Samsung Electronics Co., Ltd. (KR)

( * ) Notice: Subject to any disclaimer, the term of this patent is extended or adjusted under 35 U.S.C. 154(b) by 496 days.

This patent is subject to a terminal disclaimer.

(21) Appl. No.: 12/965,492

(22) Filed: Dec. 10, 2010

(65) Prior Publication Data

US 2011/0142073 A1    Jun. 16, 2011

Related U.S. Application Data

(60) Provisional application No. 61/285,360, filed on Dec. 10, 2009.

(30) Foreign Application Priority Data

Nov. 25, 2010  (KR) .................. 10-2010-0118120

(51) Int. Cl.
*H04L 12/50*  (2006.01)
*H04B 14/06*  (2006.01)

(52) U.S. Cl.
USPC .......................................... 370/384; 375/246

(58) Field of Classification Search
USPC ........... 375/146, 240.24, 243–248, 253, 264, 375/265; 370/328, 329, 330, 535–537, 411, 370/412, 413, 426
See application file for complete search history.

(56) References Cited

U.S. PATENT DOCUMENTS

| | | | |
|---|---|---|---|
| 5,642,241 A * | 6/1997 | Kim | ................................. 360/41 |
| 6,359,904 B1 | 3/2002 | Hamalainen et al. | |
| 7,349,481 B2 | 3/2008 | Steentra et al. | |
| 7,797,362 B2 | 9/2010 | Won et al. | |
| 7,995,667 B2 * | 8/2011 | Hansen et al. | ................. 375/265 |
| 8,154,737 B2 | 4/2012 | Ferlitsch | |
| 2004/0001553 A1 | 1/2004 | Steentra et al. | |

(Continued)

FOREIGN PATENT DOCUMENTS

| | | |
|---|---|---|
| CN | 1142649 | 2/1997 |
| CN | 1275285 | 11/2000 |

(Continued)

OTHER PUBLICATIONS

The Throughput of Hybrid-Arq Protocols for the Gaussian Collision Channel.

(Continued)

*Primary Examiner* — Hanh N Nguyen
(74) *Attorney, Agent, or Firm* — The Farrell Law Firm, P.C.

(57) ABSTRACT

A method for encoding an information object in a communication system by storing the information object in a buffer; generating a sampling set including bits randomly selected from the buffer and bits regularly selected from the buffer; generating control channel data including a sampling set number of the sampling set and size information for the information object; and modulating the sampling set and the control channel data.

8 Claims, 12 Drawing Sheets

(56) References Cited

U.S. PATENT DOCUMENTS

2007/0005795 A1     1/2007  Gonzalez
2007/0127671 A1*    6/2007  Chua et al. ............... 379/202.01
2008/0301536 A1*    12/2008 Shin et al. ..................... 714/786
2010/0290484 A1*    11/2010 Jung et al. ..................... 370/474

FOREIGN PATENT DOCUMENTS

| | | |
|---|---|---|
| CN | 1783856 | 6/2006 |
| JP | 7-274169 | 10/1995 |
| JP | 2003-513538 | 4/2003 |
| JP | 2006-139756 | 6/2006 |
| JP | 2009-020870 | 1/2009 |
| WO | WO 2004/030358 | 4/2004 |
| WO | WO2010134744 A2 | 11/2010 |

OTHER PUBLICATIONS

ETSI 101 498-1 V1.1.1 (Aug. 2000).
RFC 3926-Flute-File Delivery over Unidirectional Transport.
Information Theory, Inference, and Learning Algorithms.
Tables of Linear Congruential Generators of Different Sizes and Good Lattice Structure.

* cited by examiner

——— TRANSMISSION SIGNAL SPECTRUM
----- ACOUSTIC NOISE SPECTRUM

METHOD FOR ENCODING INFORMATION OBJECT AND ENCODER USING THE SAME

PRIORITY

This application claims priority under 35 U.S.C. §120 to a provisional application entitled "Method for Encoding Information Object and Encoder Using the Same" filed with the United States Patent and Trademark Office on Dec. 10, 2009 and assigned Ser. No. 61/285,360, and under 35 U.S.C. §119 to a Korean Patent Application filed in the Korean Intellectual Property Office on Nov. 25, 2010 and assigned Serial No. 10-2010-0118120, the entire disclosures of which are incorporated herein by reference.

BACKGROUND OF THE INVENTION

1. Field of the Invention

The present invention relates generally to data encoding and transmission technology, and is applicable to wireless communication systems and apparatuses, specifically, short-range acoustic-based communication systems and apparatuses.

2. Description of the Related Art

FIG. 1 illustrates object transmission in a conventional bidirectional communication system employing an Automatic Repeat Request (ARQ) scheme.

In the conventional communication system, a transmitter 1 decomposes an information object such as a file or a message, into data packets and encodes each decomposed packet, typically by using a certain type of Forward Error Correction (FEC) coding. The packets encoded by the transmitter 1 are then modulated, and packetized information is transmitted to a receiver 2 over a communication channel (for example, acoustic channel). In order to achieve information transmission with high reliability through a communication medium with low reliability, the conventional communication system may use an ARQ protocol. In such a protocol, the receiver 2 transmits an acknowledgement message to the transmitter 1 in order to indicate that it has correctly received a data packet. If a packet has not been correctly received, then the receiver 2 may transmit a retransmission request message to the transmitter 1. Alternatively, the transmitter 1 may attempt retransmission if there has been no acknowledgement from the receiver 1 within a specified time-out.

Modern variants of the ARQ protocol include ARQ with Chase combining and ARQ with incremental redundancy, which do not need to discard unsuccessfully received packets, but instead, request complimentary packets and attempt to combine several unsuccessfully received packets in the receiver 2. See, for example G Caire and D. Tuninetti, *The Throughput of Hybrid-ARQ protocols for the Gaussian collision channel, IEEE Trans. on Inform. Theory*, Vol. 47, No. 5, pp. 1971-1988, July 2001.

Nonetheless, in all ARQ-based schemes, it is necessary that there is a feedback communication path from a receiver to a transmitter, which can be used to transmit acknowledgement messages or retransmission requests. However, in some applications, it is difficult to implement the feedback channel because of several limiting factors. In acoustic connectivity applications, for example, the transmitter may have no capability to capture acoustical signals (for example, no microphone present), or the receiver may have no sound emitting capability, and others. In such cases, alternative schemes should be used that do not rely on the presence of a feedback communication path. Specifically, two types of schemes may be used. The first scheme is known as "broadcast carousel".

For example, see Paila, T, Luby, M., Lehtonen, R., Roca, V and R. Walsh: *FLUTE—File Delivery over Unidirectional Transport. RFC* 3926, October 2004] or [ETSI TS 101 498, Digital Audio Broadcasting (DAB); Broadcast website.

FIG. 2 illustrates object transmission in a conventional unidirectional communication system employing a broadcast carousel scheme.

In this scheme, the packets of the original message (i.e., an information object) are cyclically repeated in a loop (indefinitely) by means of transmission from a transmitter 3, and each packet has its unique identifier (number). A cyclic packet stream transmitted from the transmitter 3 to a receiver 4 includes a series of packets, such as " . . . , packet 1, packet 2, packet 3, packet 1, packet 2, packet 3, packet 1, packet 2, . . . ".

In a reliable communication channel, the receiver can collect all packets within a single loop regardless of the time of initial acquisition. If errors are introduced into the channel, then the receiver may still collect all data, but usually has to wait several "carousel" loops. As channel conditions gets worse, the broadcast carousel becomes less and less efficient. This is because in this scheme, if the receiver misses identical packets on consecutive carousel cycles, then it has to wait the full cycle for the next opportunity.

More sophisticated relevant technology uses so called "digital fountain codes". These codes may be acquired from erasure codes such as Reed-Solomon codes, or may be more efficiently and flexibly implemented with Luby Transform (LT) codes or Raptor codes See, for example, D. MacKay, *Information Theory, Inference, and Learning Algorithms*, Cambridge University Press, 2005, Chapter 50.

FIG. 3 illustrates object transmission in a conventional communication system employing digital fountain codes.

In this coding scheme, a transmitter 5 transmits a long series of unique packets generated by digital fountain codes, such as Reed-Solomon code, LT codes, or Raptor codes. Once a receiver 6 successfully receives and collects a predefined number of packets, the transmitter 5 can decode the entire message (that is, information object). The receiver 6 continues to receive packets until a minimum number of packets are collected, and then perform reconstruction. This scheme has an advantage of higher efficiency than in channels with packet losses.

In contrast, the present invention provides a system for acoustic-based connectivity between mobile devices. This type of channel is known to have many challenges, such as a high background noise level, distortions, and an unpredictable and variable signal-to-noise ratio. As mentioned above, the conventional techniques have several drawbacks, which include: ARQ schemes and their variants require a feedback channel that may not be available in some applications or may be too complex to implement; A broadcast carousel is not effective in channels in to which packet errors are frequently introduced; and LT codes or Raptor codes are almost optimal in channels with packet losses (such as Internet communication or satellite broadcasting), but may be ineffective in channels with an unpredictable signal-to-noise ratio, such as acoustic communication between mobile devices. This is because, on one hand, in very poor channel conditions, most packets may be received with errors and thus shall not provide any useful information to a decoder, or conversely, in good channel conditions, all packets may be received with significant noise margins and therefore channel capacity shall not be fully utilized by such a system.

In order to solve this problem, an improved transmission scheme should allow for "soft" information about each transmitted bit or data symbol, rather than rely on packet erasures provided by an inner code or packet Cyclic Redundancy Check (CRC) scheme (as is usually the case for Raptor or LT codes). At the same time, the system should provide close-to-optimum utilization of channel capacity in a wide range of signal-to-noise ratios and channel conditions.

SUMMARY OF THE INVENTION

Accordingly, the present invention has been made to solve the above-mentioned problems occurring in the prior art, and an aspect of the present invention provides an information object transmission scheme which permits reliable transmission of information objects in a unidirectional communication system (that is, without a feedback channel and an ARQ mechanism). Another objective of the present invention is to provide close-to-optimum channel utilization in a wide range of channel conditions by being effective in noisy channels with an unpredictable signal-to-noise ratio.

In accordance with an aspect of the present invention, there is provided a method for encoding an information object in a communication system, the method including storing the information object in a buffer; generating a sampling set including bits randomly selected from the buffer and bits regularly selected from the buffer; generating control channel data including a sampling set number of the sampling set and size information for the information object; and modulating the sampling set and the control channel data.

In accordance with another aspect of the present invention, there is provided an encoder including a precoder for encoding the information object and storing the encoded information object in a precoder buffer; a sample number/address generator for generating a sampling set number and addresses of the precoder buffer, corresponding to bits randomly selected from a sampling set and bits selected according to a predetermined rule from the sampling set; a multiplexer for selecting the bit of the precoder buffer, corresponding to the address generated by the sample number/address generator; a sampling set buffer for storing the sampling set output from the multiplexer; a control packet generator for generating control channel data including information on the sampling set number generated by the sample number/address generator; a packet assembler for assembling the sampling set stored in the sampling set buffer with the control channel data generated by the control channel generator; and a modulator for modulating a packet output from the packet assembler in a predefined scheme.

BRIEF DESCRIPTION OF THE DRAWINGS

The above and other aspects, features and advantages of the present invention will be more apparent from the following detailed description taken in conjunction with the accompanying drawings, in which:

FIG. 9A illustrates a uniform acoustic noise spectrum; and FIG. 9B illustrates the presence of narrowband-focused acoustic noise;

DETAILED DESCRIPTION OF EMBODIMENTS OF THE PRESENT INVENTION

Figure 1:
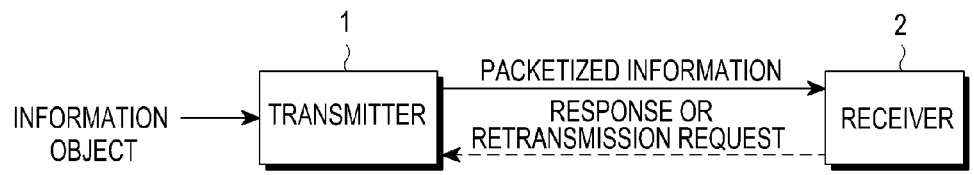
FIG. 1 is a block diagram illustrating object transmission in a conventional bidirectional communication system with an ARQ scheme.
Figure 2:
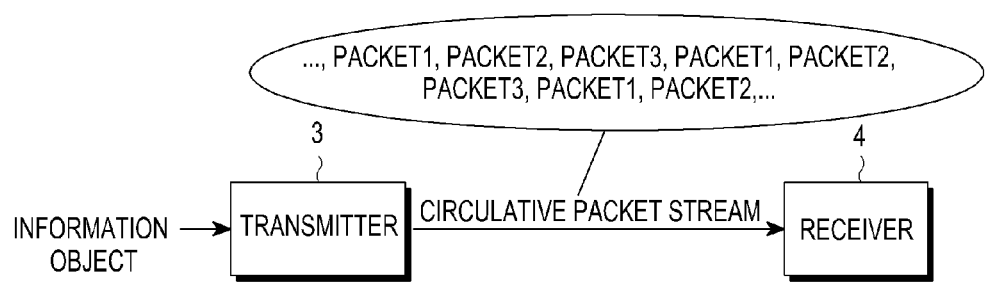
FIG. 2 is a block diagram illustrating object transmission in a conventional unidirectional communication system with a broadcast carousel scheme.
Figure 3:
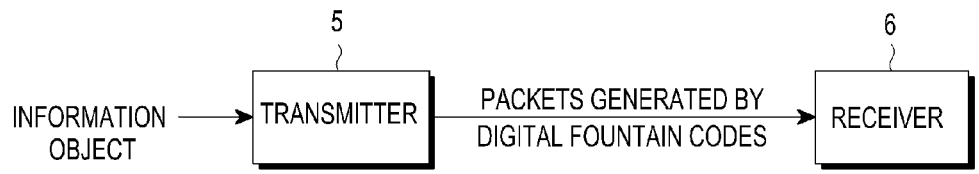
FIG. 3 is a block diagram illustrating object transmission in a conventional unidirectional communication system employing digital fountain codes.

Hereinafter, embodiments of the present invention are described in detail with reference to the accompanying drawings. In the following description, the same or similar components may be designated by the same or similar reference numerals although they are illustrated in different drawings. Further, various specific definitions found in the following description, such as specific values of packet identifications, content of displayed information, etc., are provided only to help general understanding of the present invention, and it is apparent to those skilled in the art that the present invention can be implemented without such definitions. Further, detailed descriptions of constructions or processes known in the art may be omitted to avoid obscuring the subject matter of the present invention. Those skilled in the art will appreciate that elements in the accompanying drawings are illustrated for simplification and clarification, and may not be depicted according to scales. For example, for better understanding of various embodiments of the present invention, the dimensions of some elements in the drawings may be exaggerated.

In addition, steps and components are expressed by common symbols, and only particulars related to the understanding of the present invention are illustrated in the drawings. In the present invention, relative terms, such as "a first" and "a second", may be used to discern one object from another object, but it should be noted that they do not mean any actual relation or order between the objects.

Figure 4:
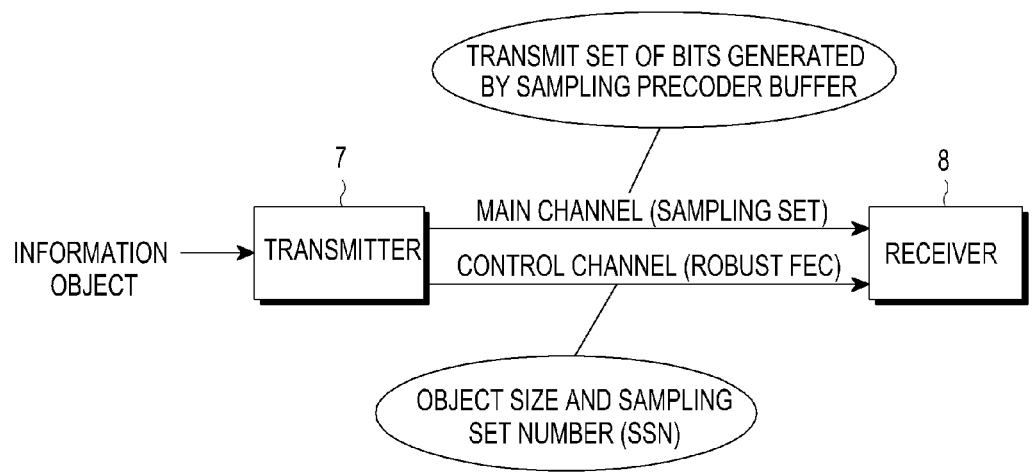
FIG. 4 is a block diagram for explaining an object transmission principle in a unidirectional communication scheme according to an embodiment of the present invention.

FIG. 4 illustrates an object transmission principle in a unidirectional communication system according to an embodiment of the present invention.

In the present system, data (that is, information object) is arranged into two logically separate channels (called a "control channel" and a "main channel"). The control channel occupies a small portion in an available bandwidth and therefore introduces only small overhead. The largest portion of the available bandwidth is allocated to the main channel. The control channel carries dynamic information that is needed to enable data reconstruction in the main channel.

In the present system, the data is also transmitted using packets. However, all the packets are not uniform. Each packet contains main channel data and control channel data, and the data in these two channels may have different error protection mechanisms and different physical modulation formats.

A transmitter 7 transmits a set of bits generated by sampling from a precoder buffer (that is, sampling set) to a receiver 8 over the main channel, and further transmits an object size and a sampling set number (SSN), encoded with a robust FEC code, to the receiver 8 over the control channel. The receiver 8 receives the packets and then repeatedly performs a decoding procedure.

The control channel carries information that enables decoding in the main channel. The main channel data must include at least the length of information object transmitted over the main channel and the current SSN. The SSN is a unique identifier that informs the receiver 8 of data arrangement in the main channel. Information in the control channel is encoded with a typical error correction code with very high redundancy, so that it can be received in very harsh noise conditions. In the main channel, an encoding computation includes two main steps. Firstly, the original message is repeated several times and interleaved, and then the resulting sequence is encoded using a convolutional code with a rate of $1/(R+1)$. That is, for each original bit of the information object, there are R parity bits generated by a convolutional encoder. All the encoded bits are stored in a precoder buffer. Secondly, at each packet generation interval, an address generator selects a predefined set of bits from the precoder buffer, and transmits these bits along with the control channel data.

The optimal packet size is chosen based on two considerations: on one hand, since the amount of data transferred over the main channel must be considerably larger than the data volume in the control channel, as mentioned above, the high redundancy of a code in the control channel has no substantially effect on the cumulative effectiveness of a transmission system; on the other hand, in many applications, a period of time of packet transmission must be relatively short (for example, 1 second) because an excessively long packet may result in an undesirable delay during reception of objects, especially for small objects. Accordingly, there must be a trade-off that depends on a specific application. A data packet is modulated in a packet assembly unit through one or several types of modulation (such as BPSK, QPSK, n-QAM), along with addition of special pilot symbols for simplifying channel estimation and equalization in a receiving apparatus. In the system under consideration, broadband modulation using one or multiple carriers may be used (for example, OFDM, CDMA etc.). The invention can be used jointly with the acoustic communication system for object transmission described in U.S. Publ. 2010-0290484 A1 entitled "Encoder, Decoder, Encoding Method, And Decoding Method" filed with the US Patent and Trademark Office on May 18, 2010 and assigned Ser. No. 12/782,520, the contents of each of which are incorporated herein by reference.

Figure 5:
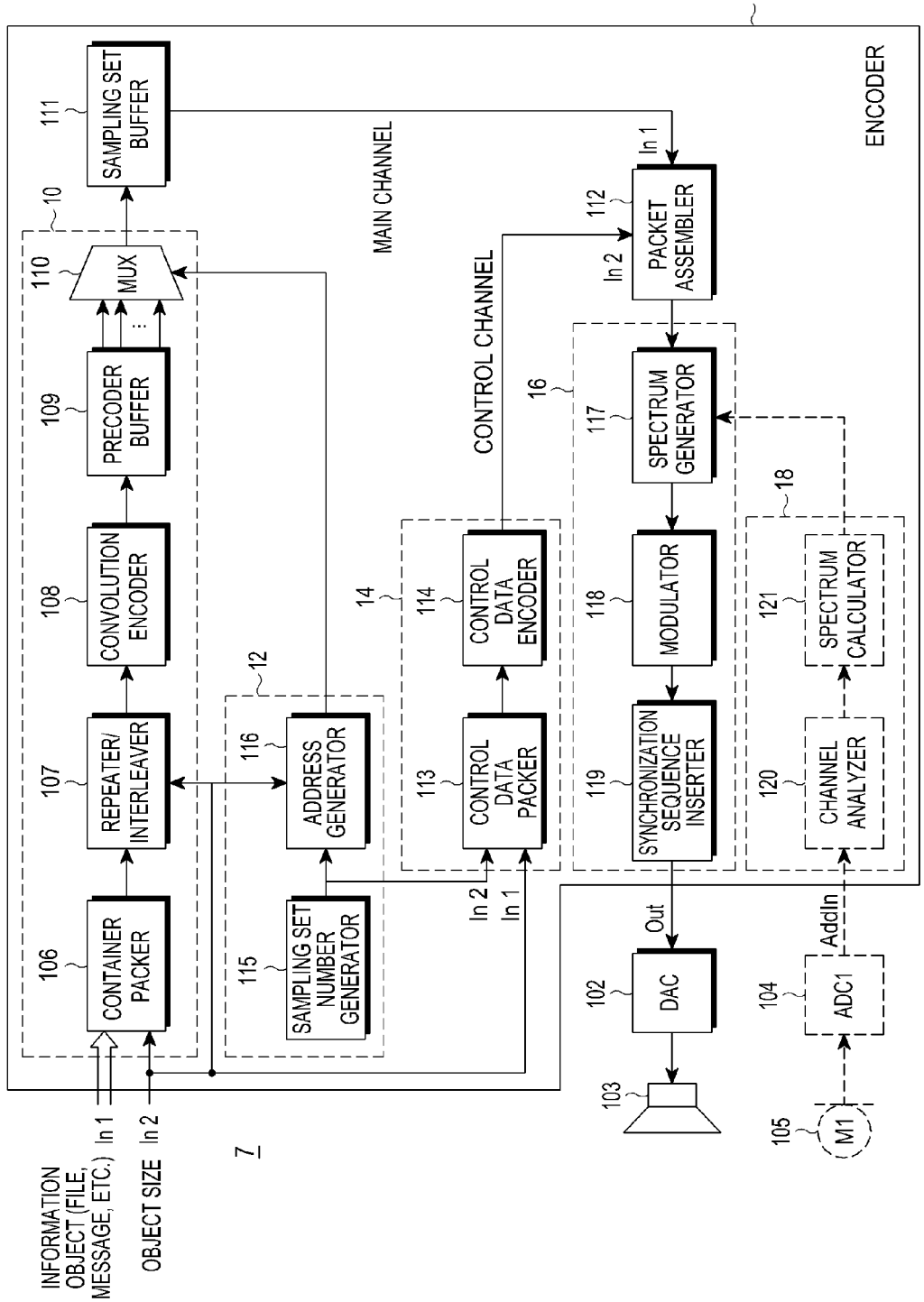
FIG. 5 is a block diagram illustrating a detailed structure of a transmitter according to an embodiment of the present invention.

FIG. 5 illustrates a detailed structure of a transmitter according to an embodiment of the present invention. In the following description, an input and an output corresponds to the input and the output of a corresponding device respectively, and the output of a first device is coupled to the input of a second device is in effect the same as the output of a first device being the input of a second device.

The transmitter 7 includes an encoder 101, and the encoder 101 collects information through its first input (In1) and second input (In2) A digital-to-analog converter (DAC) 102 and a loudspeaker 103 are successively connected to the output of the encoder 101. For communication channel diagnostics, the encoder 101 may include an additional input (AddIn) connected to a microphone M1 of the transmitter 7 through an analog-to-digital converter (ADC) 104 of the transmitter 7.

The encoder 101 includes a precoder 10 for encoding an input information object according to a predefined encoding scheme and storing the encoded information object in a precoder buffer 109, a sample number/address generator 12 for generating the sampling set number of each sampling set and an address that is an address of the precoder buffer 109, corresponding to each bit of each sampling set, a multiplexer 110 for selecting a bit of the precoder buffer, corresponding to the address generated by the sample number/address generator 12, a sampling set buffer 111 for storing bits of each sampling set output from the multiplexer 110, a control packet generator 14 for generating a control packet (that is, control channel data) including information on the sampling set number generated by the sample number/address generator 12, a packet assembler 112 for assembling the sampling set stored in the sampling set buffer 111 with the control packet generated by the control packet generator 14, and a modulator 16 for modulating a packet output from the packet assembler 112 into a sound signal according to a predefined scheme.

Additionally, the encoder 101 may further include a spectrum calculator 18 for receiving information on an external sound communication channel and calculating a sound spectrum of the received sound communication channel, and the modulator 16 may further include a constituent component for compensating for the spectrum of a sound signal based on information provided from the spectrum calculator 18.

The sample number/address generator 12 may include a sampling set number generator 115 and an address generator 116, and the control packet generator 14 may include a control data packer 113 and a control data encoder 114. Further, the modulator 16 may include a spectrum generator 117, a modulator 118, and a synchronization sequence inserter 119, and the spectrum calculator 18 may include a channel analyzer 120 and a spectrum calculator 121.

The precoder 10 includes constituent components successively connected and forming the precoder 10. Such constituent components include a container packer 106, a repeater/interleaver (or repeating/interleaving unit) 107, a convolution encoder 108, and a precoder buffer 109. Inputs of the container packer 106 correspond to the first input (In1) and the second input (In2) for each precoder 10, the encoder 101, and the transmitter 7. Outputs of the precoder buffer 109 correspond to outputs of the precoder 10, and are coupled one-to-one to inputs of multiplexer 110. The output of the multiplexer 110 is connected to the first input (In1) of packet assembler 112 via the sampling set buffer 111. In this way, a preparation channel (main channel) for encoder main data is formed.

The second input (In2) of the encoder 101 is connected to the first input (In1) of the control data packer 113 and is further connected to the second input (In2) of the packet assembler 114 via the control data encoder 114. At the same time, a preparation channel (control channel) for encoder control data is formed.

The output of the sampling set number generator 115 is coupled to the second input (In2) of the control data packer 113, as well as to the multiplexer 110 via the encoder address generator 116, which is also connected to the second input (In2) of the encoder 101. The second input (In2) of the encoder 101 is coupled to the additional input of the repeater/interleaver 107.

The output of the packet assembler 112 is coupled to the output (Out) of the encoder 101 via the sequentially connected spectrum generator 117, modulator 118, and synchronization sequence inserter 119.

The Additional Input (AddIn) of the encoder 101 is connected to the additional input of the spectrum generator 117 via the successively connected channel analyzer 120 and spectrum calculator 121 so as to calculate the optimal amplitude spectrum of a transmission signal.

Although not illustrated, the other additional inputs of the encoder 101 and/or the transmitter 7 may be used. For example, a start input for informing to specific encoder components of the necessity to transfer input data, as well as an input of an alternative communication channel for commanding the encoder 101 to terminate input data transfer.

The circuitry of the transmitter 7 is configured to enable power supply to all circuit components.

The transmitting side of the system according to the present invention, including the transmitter 7, functions as follows.

The transmitter 7 is switched on when the encoder 101, the digital-to-analog converter 102, the analog-to-digital converter 104, the loudspeaker 103, and the microphone 105 are energized and in a standby mode.

At the preliminary stage of encoding, an information object (10; file, message, and the like) is input into the first input (In1) of the transmitter 7, and data on the size of the IO is input into the address generator 116 and the control data packer 113 through the second input (In2) of the transmitter 7. In the container packer 106, the IO is packed into a standard container. To this end, a header label is added to the IO, and a byte for integrity checking (for example, check sum, CRC, Hash-code, etc.) is set.

Further, in the container packer 106, the container may be encoded by means of an error-correcting code (for example, a Reed-Solomon code). The container from the container packer 106 and the size information of the IO from the container packer 106 or the second input (In2) of the encoder 101 are conveyed to the repeater/interleaver 107, where the data bits of the container are repeated and mixed a given number of times. Pseudorandom function of such rearrangement depends on the size of the IO.

Subsequently, convolution code encoding is carried out in the convolution encoder 108. It is known that formation of encoded bits in this manner (that is, repeating and interleaving followed by convolution encoding) achieves a high noise-immunity of the code in the case of iterative decoding on the receiving side. However, in the present invention, the IO (data block for transmission) encoded in this manner is not directly transmitted to the modulator and over the communication channel. The encoded IO is transferred to the precoder buffer 109 from the convolution encoder 108.

The data block for transmission is stored in the precoder buffer 109 for the main stage of encoding. The preliminary stage is carried out only once before the start of transfer over the communication channel (in this embodiment, acoustic channel), and thus the content of the precoder buffer 109 remains unchanged, even when additional adjustment of the transmission properties according to the variable communication channel is needed.

It should be noted that the precoder 10 in other embodiments of the above-suggested technical implementations may be formed by any known method. An error-correcting code with arbitrary redundancy may be used.

Subsequently, the basic (main) stage of encoding is carried out. When the transmitter 7 is switched on, the sampling set number generator 115 is started by any known method (namely, by a start input or a command from the repeater/interleaver 107).

The sampling set number generator 115 generates sampling set numbers functioning as identification numbers with a defined periodicity (random or successive values) for bit sampling from the precoder buffer 109, and conveys them to the address generator 116 and the second input (In2) of the control data packer 113.

One key element directly affecting the performance of the present invention is the address generator 116 that realizes a bit selection function. The address generator 116 controls how bits are sampled from the precoder buffer 109. The precoder buffer 109 shall typically contain original (systematic) data and some additional parity data. In fact, a bit selection procedure may be purely random, but system performance may be somewhat worse than the optimal performance. This is because, when bit positions are selected in a purely random way, some of bits may be repeated in consecutive packets or even in the same packet several times while some of the bits may not be represented in the sampling set buffer 111 for a prolonged period of time.

Figure 6:
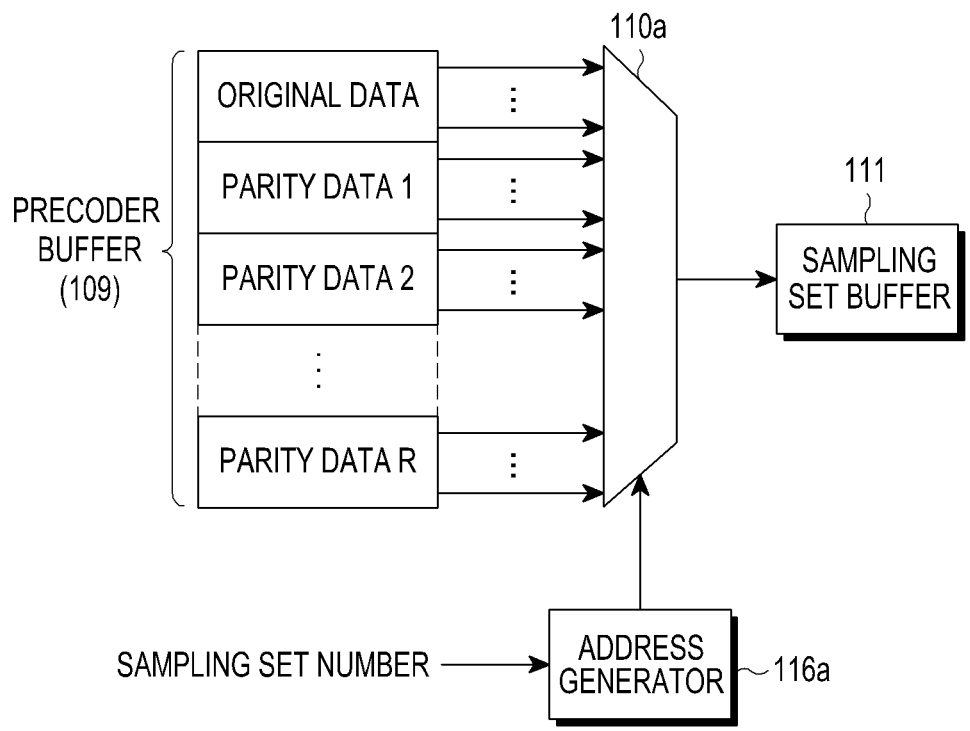
FIG. 6 is a block diagram illustrating a sampling set selection method according to a comparative embodiment of the present invention.

FIG. 6 illustrates a sampling set selection method according to a comparative embodiment of the present invention.

In this comparative embodiment, a simple pseudo-random function, such as a linear congruential generator (LCG), is used as an address generator 116a. In this context, the address generator 116a has one desirable property. The address generator 116a generates pseudorandom numbers in cycles, and the full-cycle address generator 116a does not repeat the generated numbers within cycles. If such an address generator 116a is used in the system of the present invention, the sampling set buffer 111 that receives a sampling set through a multiplexer 110a shall not contain bit repetitions (if the sampling set buffer 111 is smaller than the encoded buffer). Further, if the address generator 116a is initialized to a state corresponding to the last state of the address generator 116a during previous packet transmission, then bits within two consecutive sampling sets shall not overlap as well. Unfortunately, this approach also has drawbacks. The major drawback is that the full-cycle address generator 116a cannot be easily constructed for arbitrary object lengths. Therefore, if the length of an object is significantly different from one of predefined values, then system performance may be deteriorated.

Figure 7:
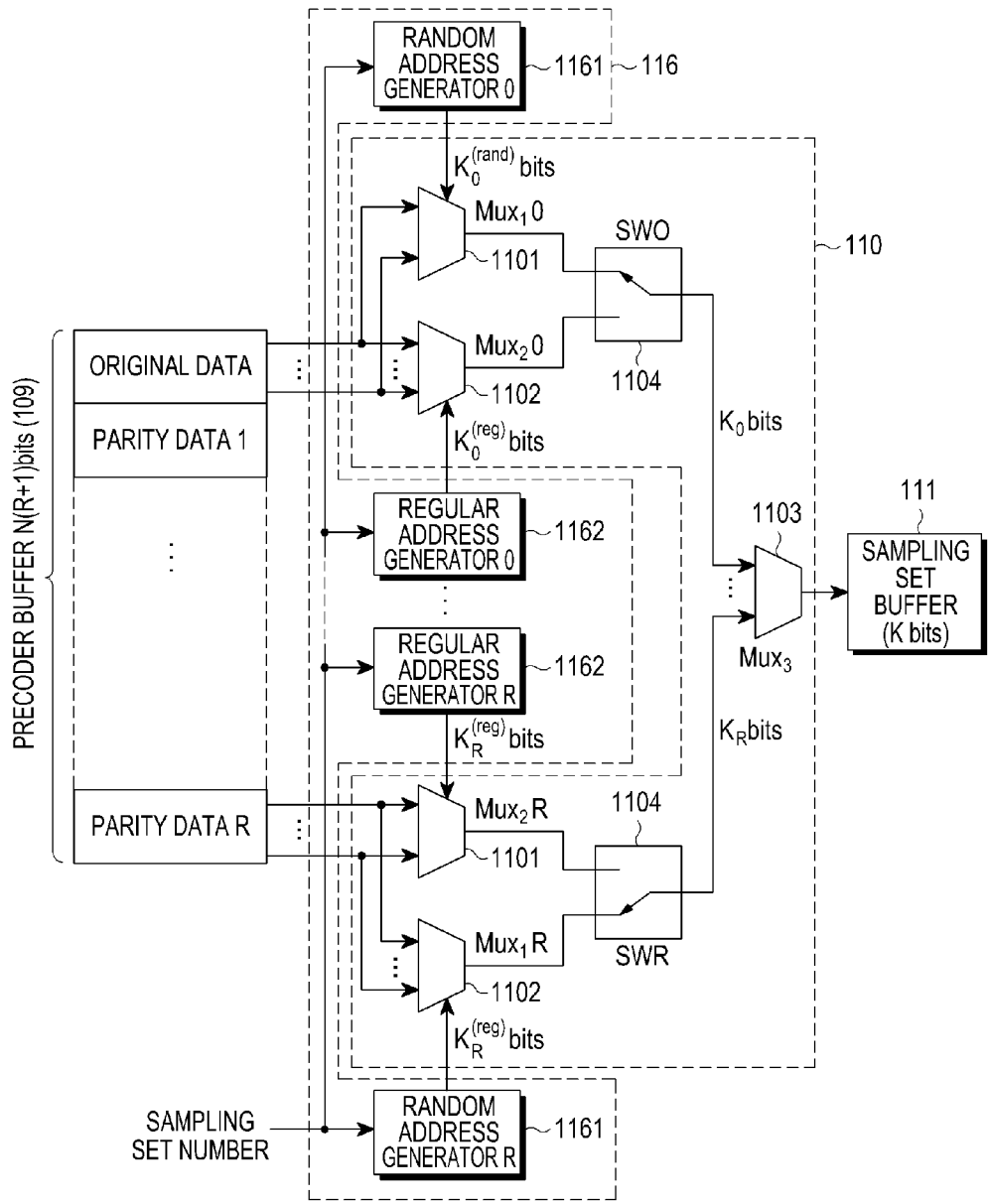
FIG. 7 is a block diagram illustrating detailed structures of an address generator and a multiplexer according to an embodiment of the present invention.

FIG. 7 illustrates detailed structures of an address generator and a multiplexer according to an embodiment of the present invention.

The address generator 116 includes multiple random address generators (RaAGs) 1161, that is, (R+1) random address generators RaAG0 to RaAGR, for outputting random values in order to select random bits respectively, and multiple regular address generators (ReAGs) 1162, that is, (R+1) regular address generators ReAG0 to ReAGR, for outputting regular values according to a predefined rule in order to select regular bits respectively. The multiplexer 110 includes multiple first multiplexers ($MUX_1$) 1101 connected one-to-one to the multiple RaAGs 1161, that is, (R+1) first multiplexers MUX$_1$0 to MUX$_1$R, multiple second multiplexers (MUX$_2$) 1102 connected one-to-one to the multiple ReAGs 1162, that is, (R+1) second multiplexers MUX$_2$0 to MUX$_2$R, multiple switches (SWs) 1104 connected to the corresponding RaAGs 1161 and ReAGs 1162 respectively, that is, (R+1) switches SW0 to SWR, and a third multiplexer (MUX$_3$) 1103 connected to the multiple SWs 1104. Each of the multiple RaAGs 1161 and the multiple ReAGs 1162 receives a common sampling set number from the sampling set number generator 115. A pair of the RaAG 1161 and the ReAG 1162 corresponds to the original data segment or the corresponding parity data segment of the precoder buffer 109. The pair of the RaAG 1161 and the ReAG 1162 is connected to the corresponding SW 1104. With regard to this, outputs of the RaAG 1161 and the ReAG 1162 are coupled to the first and second inputs of the SW 1104 respectively, and the output of the SW 1104 is coupled to the corresponding input of the third multiplexer 1103.

A sampling set selection method according to the present invention is suitable for an information object of arbitrary length.

A set of bits selected from precoder buffer 109 must satisfy two somewhat contradictory conditions: on one hand, it should have basic "random" properties, yet it should generate minimum possible repetitions in a single sampling set, as well as in several consecutive sampling sets. To achieve this goal, in the present invention, the following procedure is performed.

Firstly, to enable a uniform representation of bits from the original and parity data, the precoder buffer 109 is divided into (R+1) segments, where bits numbered from 0 to N−1 represent original data bits, bits numbered from N to 2N−1 represent first parity bits, bits numbered from 2N to 3N−1 represent second parity bits, and so on.

Secondly, two groups of bits are selected from each segment of the precoder buffer 109: a regular group and a random group.

The random group shall be selected in a purely random way by using the suitable random generator 1161 with good statistical properties. The regular group shall be selected by a well-structured algorithm as will be described below in detail.

The number of bits selected from the original segment of data will be denoted as $K_0$, and the number of bits selected from the i-th parity segment will be denoted as $K_i$ (i.e., $K_1$, $K_2$, ..., $K_R$), represented by Equation (1):

$$K_0+K_1+K_2+\ldots K_R=K \text{ (total number of bits allocated per sampling set)} \quad (1)$$

A set of bits selected from the original segment consists of $K_0^{(reg)}$ regularly selected bits and $K_0^{(rand)}$ randomly selected bits. Similarly, a set of bits selected from the i-th parity segment consists of $K_i^{(reg)}$ regularly selected bits and $K_i^{(rand)}$ randomly selected bits.

The total number of bits stored in precoder buffer 109, (R+1)N, is usually much larger than the number of bits in a sampling set, K.

Selection of a random group of bits from each data segment may be performed using random address generators 1161 that produce pseudorandom numbers in the range from 0 to N−1, where N is the size of each segment (or length of original data). To select $K_0^{(rand)}$ random bits from the original data segment, the output of the random address generator 1161 shall be directly used as a bit address. Further, to select random bits from one of parity segments, an address may be generated as represented by Equation (2):

$$k_{rand}=N \cdot i + \text{rand}(0,N-1) \quad (2)$$

where i represents the index of parity segment. To synchronize both the transmitter 7 and the receiver 8, the random number generators 1161 should be initialized with the same random seed, which is usually some function of a sampling set number, that is, rand_seed=f(SSN).

To select $K_0^{(reg)}$ regular bits from the original data segment, the regular address generator 1162 may produce the bit selection index according to Equation (3):

$$k_j=(j \cdot P_0 + A_0)_{mod N}, \quad (3)$$

where $()_{mod N}$ represents the modulo operation that returns the remainder of division of ( ) by N, and j is a sample index that takes the following values, represented by Equation (4):

$$j = (SSN \; K_0^{(reg)})_{mod N}, \quad (4)$$
$$(SSN \; K_0^{(reg)} \; 1)_{mod N} +, \ldots, (SSN \; K_0^{(reg)} \; K_{0+}^{(reg)} \; 1)_{mod N}$$

where SSN is a sampling set number, $A_0$ is a preselected constant (fixed offset), and $P_0$ is a parameter that depends on the original data size N. To achieve desirable properties, $P_0$ must be relatively prime to N, that is, $P_0$ should be prime and also should not be a divisor of N. A simple solution to generate the parameter $P_0$ is to scan a table of prime numbers and choose the first prime number from a predefined table. By dividing N by this number, a non-zero remainder is produced. If the remainder of division N by $P_0$ candidate is zero, then the next prime value shall be selected from the table, and rem[N/$P_0$] condition, which is a function for calculating a remainder value, shall be verified again. It can be noted that, if the parameter $P_0$ has been chosen correctly, the index shall span all possible values in the range from 0 to N−1 before repeating itself. Therefore, if we consider several consecutively generated sampling sets with indexes of SSN=m, m+1, m+2, m+2, ..., we shall see that all the bits of the original data segment are represented in the selected sampling sets without omissions and with a minimum number of repetitions.

The same procedure shall be used to select $K_i^{(reg)}$ regular bits from parity data segments. The regular address generator 1162 shall produce a bit selection index according to Equation (5):

$$k_j=N \cdot i + (j \cdot P_i + A_i)_{mod N}, \quad (5)$$

where j is a sample index that takes the following values, represented by Equation (6):

$$j = (SSN \; K_i^{(reg)})_{mod N}, \quad (6)$$
$$(SSN \; K_i^{(reg)} \; 1)_{mod N} +, \ldots, (SSN \; K_i^{(reg)} \; K_{i+}^{(reg)} \; 1)_{mod N}$$

where $A_i$ and $P_i$ are parameters similar to $A_0$ and $P_0$. To get better results, $A_i$ and $P_i$ for each segment (original and parity) should be different. $A_i$ coefficients may be preselected and fixed for any values of N.

$P_i$ coefficients may be selected using the same approach as $P_0$, but searching for relatively prime number $P_1$ may be initiated from the first prime number larger than $P_0$ in order to get dissimilar values for $P_i$. Similarly, searching for relatively prime number $P_2$ may be initiated from the first prime number larger than $P_1$, and so on.

In order to achieve better performance, the parameters $P_0$, $P_1$, ..., $P_R$, and $A_0$, $A_1$, ..., $A_R$ may be dynamically modified after generation of a certain number of sampling sets. Several sets of parameters $A_0$, $A_1$, ..., $A_R$ may be predefined and stored in a ROM table whereas parameters $P_0, P_1, \ldots, P_R$ may be reselected using the algorithm described above, that is, choosing a number from the table of prime numbers and checking if the number is relatively prime to N, but in each selection case, the rearranged (permuted) prime number table may be used. This method prevents the transmitter 7 from selecting substantially the same set of regular group of bits more than once.

Figure 8:
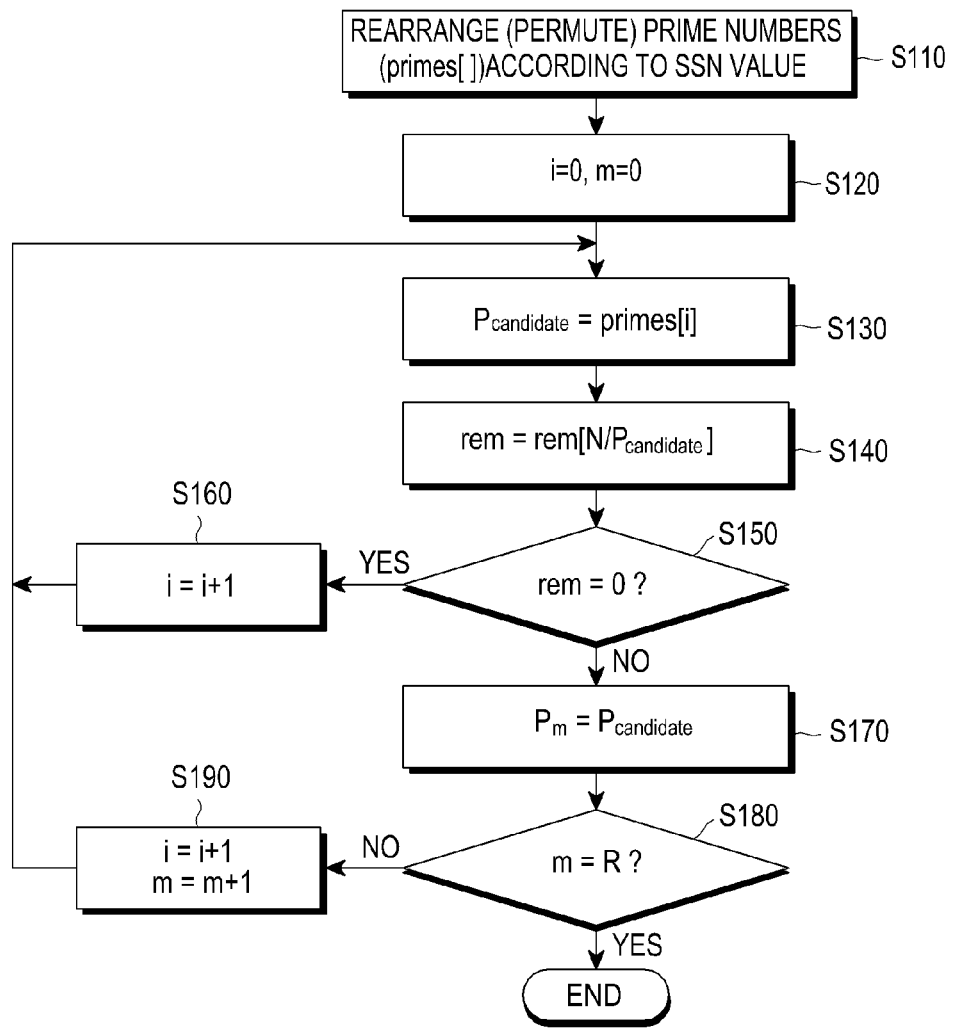
FIG. 8 is a flowchart illustrating a parameter selection procedure for a regular sampling address generator according to an embodiment of the present invention.

FIG. 8 illustrates a parameter selection procedure for a regular sampling address generator according to an embodiment of the present invention.

In Step S110, prime numbers (primes[ ]) in a table of prime numbers are rearranged (permuted) according to inputting of a sampling set number. In Step S120, the parameters i and m are initialized to 0. In Step S130, the i-th prime number primes[i] is set to a candidate value $P_{candidate}$. In Step S140, the remainder value of division of N by the candidate value $P_{candidate}$ is set as a remainder value rem. In Step S150, whether or not the remainder value rem is 0 is determined. When the reminder value rem is 0, the parameter i is increased by 1 in Step S160, and the procedure returns to Step S130. When the remainder value rem is not 0, the parameter $P_m$ is set to $P_{candidate}$. in Step S170. In Step S180, whether or not the parameter m is equal to R is determined. When the parameter m is not equal to R, the parameters i and m are increased by 1 respectively in Step S190, and the procedure returns to Step S130. When the parameter m is the same as R, the parameter selection procedure is ended.

Referring again to FIG. 5, a sampling bit set from the sampling set buffer 111 is conveyed to the first input of the packet assembler 112, without application of additional error-correcting coding. Thus, preparation for information object transfer is finalized in a so called "main channel".

When object size information is input from the second input (In2) to the first input of the control data packer 113, a sampling set number input from the sampling set number generator 115 to the second input of the control data packer 113 initializes an operation of the control data packer 113. The control data packer 113 assembles control data containing a container size and/or object size, a sampling set number, and other subsidiary information (in consideration of the operation of the control data packer). In the control data encoder 114, control data is encoded with an error-correcting code, and a specific check symbols are added for checking the control packet integrity (for example, its check sum, CRC, etc.). A control packet generated in the control data encoder 114 is conveyed to the second input of the packet assembler 112. Thus, simultaneously with each sampling set formation in the "main channel," a control packet corresponding thereto is formed in the "control channel".

As a rule, encoding in the control channel is carried out by a high redundancy code and consequently, high noise immunity, so that the control channel could be received in severe noise and interference conditions in the communication channel. With regard to this, the control channel contains only a small amount of information compared to the information volume in the main channel, by reason of which cumulative redundancy conditioned by the control channel presence is comparatively small.

Organization of two-channel encoding in such a way, where redundancy in the main channel is small compared to the control channel redundancy, considerably increases the information object transfer speed, of large objects as well. That is, the lower the data redundancy of the primary channel, the higher the information object transfer speed by means of pseudorandom samples. By the same degree of noise immunity in the main and control channels, information object transfer speed also increases considerably due to high probability of iterative reception of separate samples and respectively, successful restoration of the information object.

The main channel and the control channel may have different security mechanisms and different physical formats. The control channel carries information, which enables decoding of the main channel and includes the length of an information object transmitted over the main channel and a current sampling set number. The sampling set number servers as a unique identifier for notifying the receiver 8 of the data arrangement of the main channel.

The encoding operation of the main channel may be generally divided into two stages. In the first stage, the original information object is repeated several times and then interleaved. Then, the resultant object may be decoded by using, for example, convolution codes having a ratio of 1/(R+1) (that is, R parity bits are generated for each original bit of the information object), and all the bits decoded in the convolution encoder 108 are stored in the precoder buffer. In the second stage, during each packet generation interval, a set of preset bits are selected from bits stored in the precoder buffer 109 according to the address generated by the address generator 116, and then these bits are transmitted together with the control channel data.

Control packet bits and sample bits (that is, bits of the sampling set) form an optimal size data packet. The optimal packet size is chosen based on two considerations: on one hand, since the amount of data transferred over the main channel must be considerably larger than the data volume in the control channel, as mentioned above, the high redundancy of a code in the control channel has no substantial effect on the cumulative effectiveness of a transmission system; on the other hand, in many applications, a period of time of packet transmission must be relatively short (for example, 1 second) because an excessively long packet may result in an undesirable delay during reception of objects, especially for small objects. Accordingly, there must be a trade-off that depends on a specific application.

The data packet is modulated in a packet assembler 112 through one or several types of modulation (such as BPSK, QPSK, n-QAM), along with addition of special pilot symbols for simplifying channel estimation and equalization in the receiver 8. In the system, for example, broadband modulation using one or multiple carriers may be used (for example, OFDM, CDMA etc.). In order to reduce perceptibility of the audible tone to the user and at the same time preserve average power and wideband properties of the tone, a tone spectrum is corrected in the spectrum generator 117 prior to transmission to the modulator 118. For example, a filter may be used to implement such capability. Spectrum correction may be performed adaptively.

Such correction is possible when the transmitter 7 includes the microphone (M1) 105 and the Analog-to-Digital Converter (ADC1) 104. Audible tones, conveyed from the microphone (M1) 105 through the analog-to-digital converter (ADC1) 104, are analyzed in a given cycle in the channel analyzer 120. Here, the level and spectral composition of the acoustic noise in the communication channel are evaluated. In the given system embodiment, the acoustic noise includes all audible tones (speech, music, audible tone of notification, etc.), with exception of signals emitted by the transmitter 7 itself. Subsequently, based on a psycho-acoustic model of acoustic perception, which is implemented in the spectrum calculator 121, the optimal signal spectrum is calculated, by which the power of the signal is provided at the maximum level without a change in acoustic perceptibility.

Figure 9A:
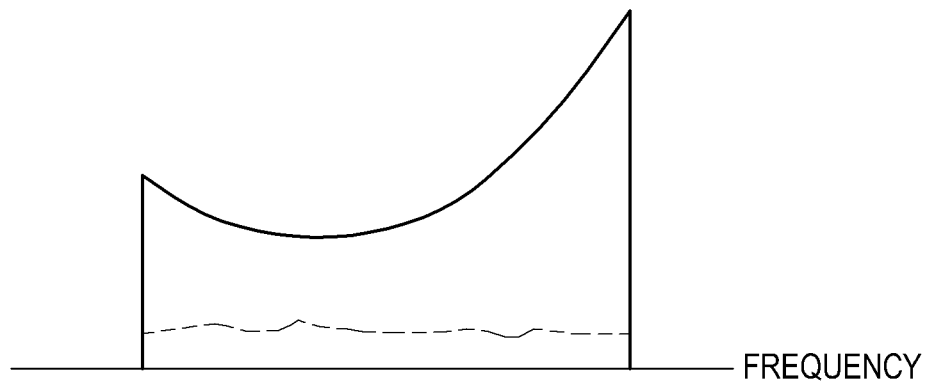
FIGS. 9A-9B are graphs illustrating distribution examples of a transmission signal amplitude spectrum where
Figure 9B:
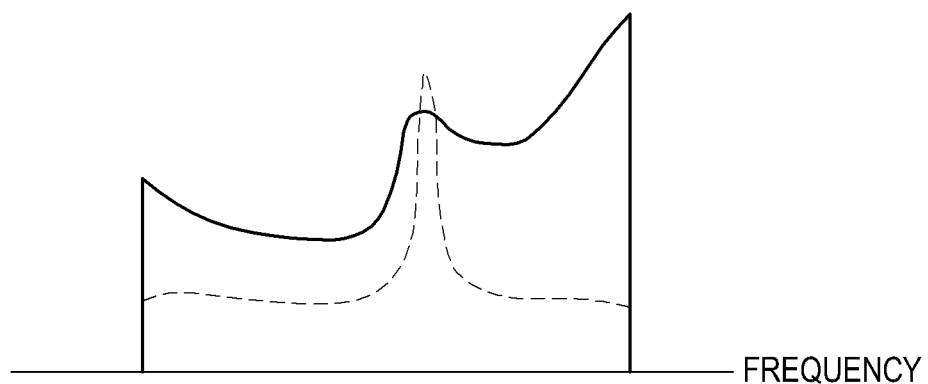

FIG. 9 illustrates distribution examples of a transmission signal amplitude spectrum: (a) in the case of a uniform acoustic noise spectrum; and (b) in the presence of narrowband-focused acoustic noise.

Specifically, in the spectrum calculator 112, frequency concealment effect is applied, as illustrated in FIG. 9 where preferable signal spectrums are designated by the solid line in the communication channels with acoustic noise (designated by a dotted line). Thus, in the case where the acoustic noise level is close to the uniform ((a) of FIG. 9), a distribution of the amplitude spectrum is inversely proportional to the average sensitivity of the human ear to the noise signal (for example, such sensitivity characteristic is determined in the standard ITU-R 468).

In the case of severe acoustic interference with expressed peaks in certain frequencies, the optimal distribution is determined by ear sensitivity to noise signals taking into account the frequency concealment effect. Such a distribution example is given in (b) of FIG. 9. A severe unwanted audible tone masks signal components, located on the neighboring frequency intervals, and thus the intensiveness of the transferred signal on the adjacent frequencies may be increased without a subjective increase in the acoustic volume of the transferred signal.

Data estimated from the spectrum calculator 112 is transferred to the spectrum generator 117, in which the spectrum correction of a signal is carried out according to the variable communication channel for each data packet, which still further increases the possibility of error-free data reception by the receiver 8 (and thus increases transmission speed as well), and leaves a transmitted signal barely noticeable to the user.

Further, in the modulator 118, the corrected symbols are modulated, thus obtaining signal information. In the synchronization sequence inserter 119, synchronous signals are added in the time domain to the data signal for simplification of the synchronization and channel alignment procedure in the receiver. The transmission signal obtained in this way is conveyed to the communication channel via to the digital-to-analog converter 102 and the loudspeaker 103.

Figure 10:
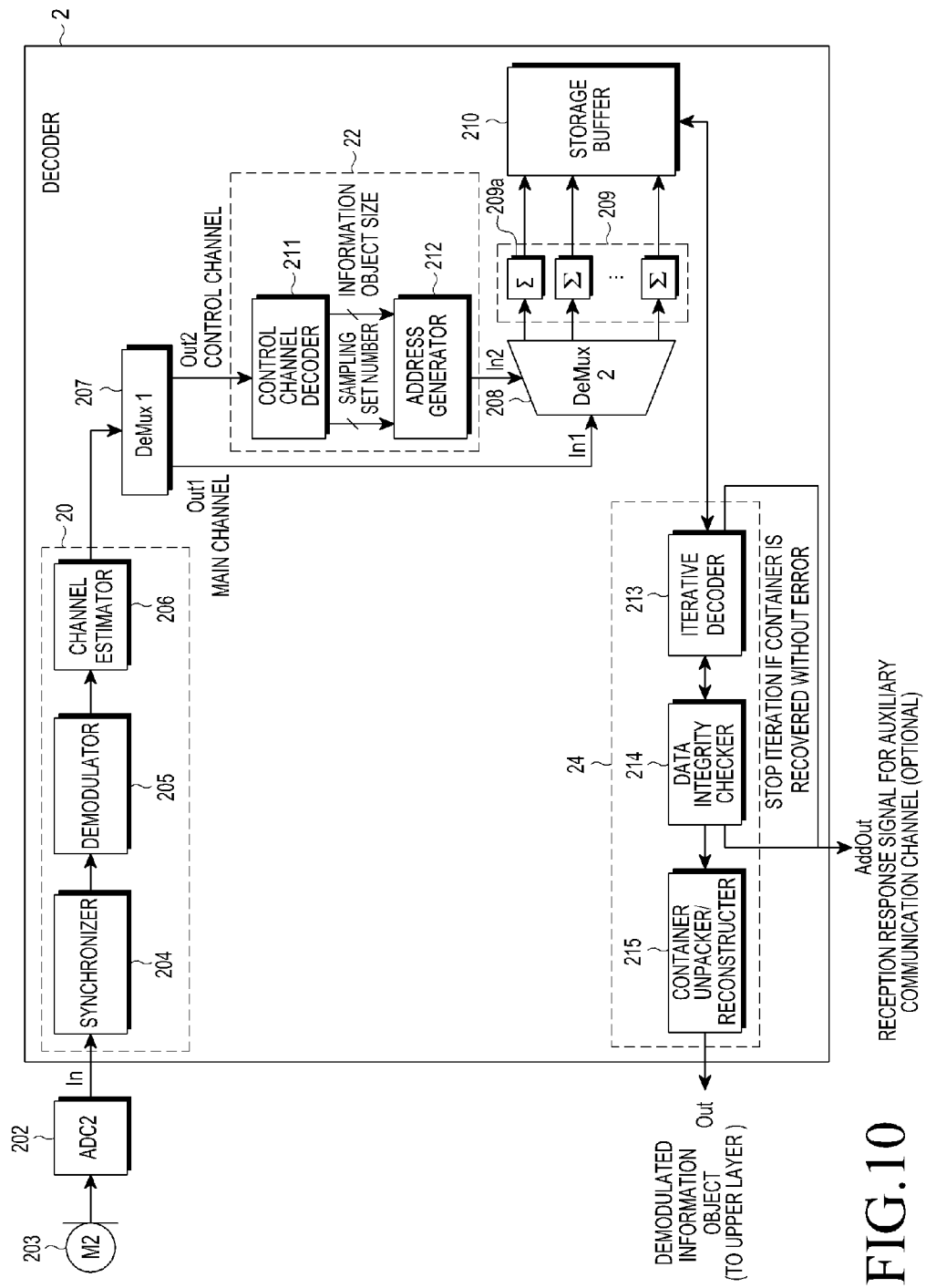
FIG. 10 is a block diagram illustrating a detailed structure of a receiver according to an embodiment of the present invention.

FIG. 10 illustrates a detailed structure of a receiver according to an embodiment of the present invention.

On the receiving side, a signal is first modulated, and then channel distortions may be compensated for in a channel equalizer.

Hereinafter, the operation of the receiver 8 will be discussed.

A demodulator 205 creates "soft" bit decisions for the main and control channels. The soft bit decisions for the control channel is conveyed to a channel decoder 211. In the case of successful control channel decoding, information on the object container size and the current SSN is delivered to an address generator 212 corresponding to the address generator 116 on the side of the transmitter 7.

The soft bit decisions corresponding to the main channel are demultiplexed by a second demultiplexer (DeMux 2) 208 according to address information generated by the address generator 212. Then, soft decisions for each received sampling set bit are gradually accumulated in an accumulator 209a (each accumulator 209a of a summator 209 corresponds to 1 bit within the precoder buffer 109). Subsequently, the accumulated soft decisions are stored in a storage buffer 210. The decoding procedure is stared in an iterative decoder 213 immediately after a specific minimum number of soft decisions are delivered to the storage buffer 210. After a decoding attempt, the receiver 8 shall check the integrity of the decoded object, and the decoding procedure shall be terminated if the integrity check is successful. If the integrity check is unsuccessful, then the decoder 201 shall wait for arrival of the next packet having the next sampling set, and then attempts decoding again. The decoder 201 shall continue to perform this procedure until the object is accurately decoded in the end.

The receiver 8 includes a decoder 201, and the input (In) of the decoder 201 is connected to a microphone (M2) 203 of the receiver 8 via an analog-to-digital converter (ADC2) 202 of the receiver 8.

The decoder 201 includes a demodulator 20 for demodulating an input sound signal according to a predefined modulation scheme, a first demultiplexer (DeMux1) 207 for deciding a soft value of each reception bit output from the demodulator 20 and separating sampling set bits from control packet bits containing information on a corresponding sampling set, an address generator 22 for generating an address corresponding to each bit of the corresponding sampling set, a second demultiplexer (DeMux2) 208 for receiving the soft decision of the sample bits and demultiplexing and outputting the soft decision according to the address information generated by the address generator module 22, a summator 209 for summating the soft decision for each output of the second demultiplexer 208, a storage buffer 210 for storing the summated soft decisions from the summator 209, and a decoder 24 for decoding sampling sets stored in the storage buffer 210.

The demodulator 20 may include a synchronizer 204, a demodulator 205, and a channel estimator 206, and the address generator 22 may include a control channel decoder 211 and an address generator 212. Further, the decoder 24 may include an iterative decoder 213, a data integrity checker 214, and a container unpacker/object reconstructer 215.

In the decoder 201, the synchronizer 204, the demodulator 205, the channel estimator 206, and the first demultiplexer are successively connected to each other.

The first output (Out1) of the first demultiplexer 207 is coupled to the first input (Input1) of the second demultiplexer 208, and outputs of the second demultiplexer 208 are coupled to the corresponding inputs of the storage buffer (SB) 210 through the respective summators (Σ) 209. The number of the accumulators 209a constituting the summator 209 corresponds to the number of bits in the precoder buffer 109 of the encoder 101 illustrated in FIG. 5.

The second output (Out2) of the first demultiplexer 207 is connected to the control channel decoder 211, the first and the second outputs of the control channel decoder 211 are coupled to the respective inputs of the address generator 212, and the output of the address generator 212 is coupled to the second input (In2) of the second demultiplexer 208.

The storage buffer 210 is connected to the output of the decoder 201, which is the data output (Out) of the receiver 8, through the successively connected iterative decoder 213, the data integrity checker 214, and the unpacker/reconstructer 215. At the same time, the additional output of the data integrity checker 214 is coupled to the additional input of the iterative decoder 213, and is the additional output (AddOut) of the receiver 8 as well.

The receiver 8 circuitry is configured to enable power supply to all the respective circuit components, and may have such a power supplier.

The receiving side of the system, including the receiver 8, operates in the following manner:

The receiver 8 is switched on when the decoder 201, the analog-to-digital converter (ADC2) 202, and the microphone (M2) 203 are energized and are in a standby mode.

A signal from the communication channel through the microphone (M2) 203 is conveyed to the analog-to-digital converter (ADC2) 202, where the signal is digitized and transferred to the input of the decoder 201. In synchronizer 204, after detection of the transmission signal by a synchronous signal, the boundaries of the signal are restored, a sampling frequency is correctively adjusted, and an incoming signal is received. Subsequently, the received signal is conveyed to the demodulator 205 with one or multiple carriers, which is implemented in correspondence with the modulator 118, based on a filter bank or fast Fourier transformation. In the channel estimator 206, the communication channel and the noise components is evaluated using pilot symbols, and a distortion spectrum is evaluated adaptively. In the first demultiplexer 207, "soft" values of the received bits are determined, and sample bits for the "main" channel and control packet bits for the "control" channel are separated.

The "soft" decisions of the control packet are conveyed to the control channel decoder 211, designed in compliance with the control data encoder 114 illustrated in FIG. 5. In the case of successful decoding of the control packet, container size data through the first output of the control channel decoder 211 and a sampling set number through the second output of the control channel decoder 211 are transferred to the respective inputs of the address generator 212 that is analogous to the address generator 116 of the transmitter 7. At the same time, bit addresses are generated in the address generator 212, corresponding to the addresses of the precoder buffer 109 of the transmitter 7.

The "soft" decisions, corresponding to the sample bits, are demultiplexed by the second demultiplexer 208 in accordance with address information generated by the address generator 212. Subsequently, the "soft" decisions in each received sample bit are gradually accumulated in the corresponding summator 209 (each accumulator 209a corresponds to one bit in the precoder buffer 109). Thus, the accumulated "soft" decisions after a certain number of received sample bits are stored in the storage buffer 210. As soon as the predefined required minimum number of "soft" decisions is delivered from the precoder buffer 109 to the storage buffer 210 (determined by the iterative decoder 213) corresponding to the data package bits, a decoding procedure for the "soft" decisions of the data packet received from the precoder buffer 109 is started in the iterative decoder 213.

It should be noted that decoding may be started in the iterative decoder 213, even when a part of the accumulators in the summator 209 is not filled. At the same time, the code properties during the iterative decoding will be equivalent to similar punctured code properties, that is, will be close to optimal.

After each decoding attempt, the data integrity checker 214 requests the iterative decoder for corresponding iteration (rigid decisions), and then checks integrity of the received data package by using rigid decisions provided by the encoder. When the check is successful, the received data package is transferred to the unpacker/reconstructer 215, where it is unpacked for the container extraction and the information object restoration. Additionally an iteration termination command is generated in the data integrity checker 214 and conveyed to the iterative decoder 213. Then, the information object is transferred to the user device, in the upper processing layer, through the output of the receiver. Simultaneously, a reception acknowledgement signal is issued using the additional output (Addout) of the receiver over an auxiliary (backward) communication channel (for example, a radio channel, acoustic channel, or visual channel) of the receiver.

Additional data decoding from the storage buffer 210 is carried out with a defined periodicity, provided that during the complete decoding cycle (for example, determined by the several tens of iterations), the data package was not restored and a new sampling set has arrived through the first demultiplexer 207 (that is, the storage buffer content is renewed). In the iterative decoder 213, the decoding procedure is repeatedly started using the new data from the storage buffer 210. Such a repeated decoding procedure is performed until the decoder 201 is capable of error-free restoring of the data package transmitted from the precoder buffer 109.

If the receiver receives a series of consecutive packets, the received sampling sets represent all the bits of the original data segment and the parity segments without omissions and with small number of repetitions. In contrast, if each sampling set would be selected in a purely random way, the number of omissions and repetitions would be relatively much higher.

Figure 11A:
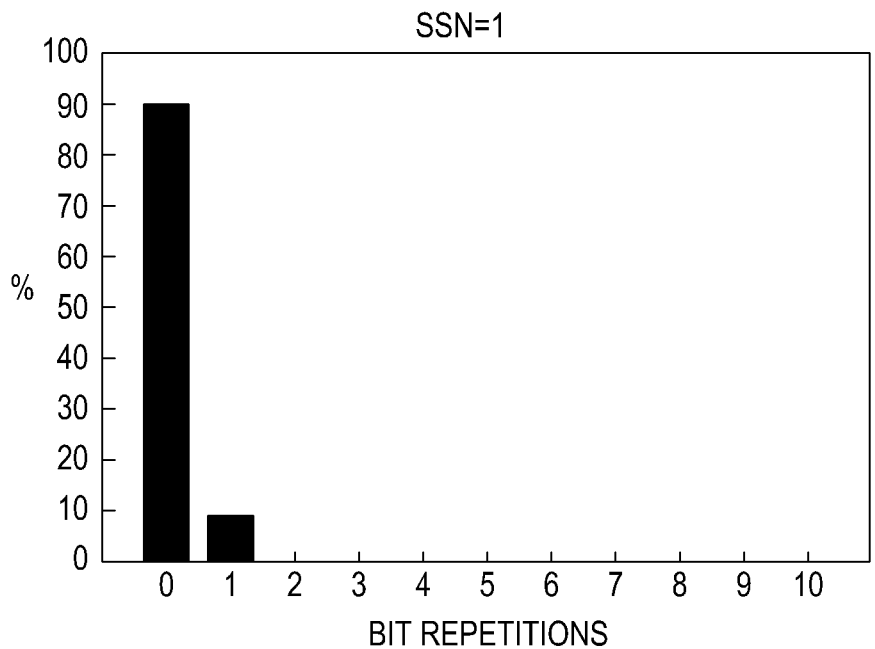
FIGS. 11A-11C are histograms illustrating distributions of bit repetitions in a randomly sampled set where 11A illustrates distribution after receiving one set; 11B illustrates distribution after receiving 5 consecutive sets; and 11C illustrates distribution after receiving 10 consecutive sets (Here, $N=1000$, $K_0=100$)
Figure 11B:
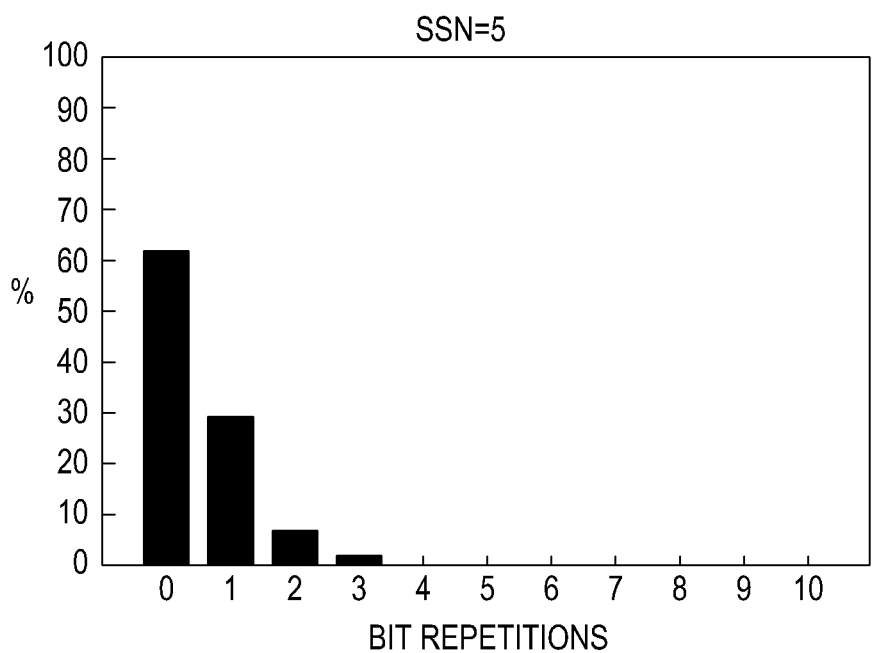
Figure 11C:
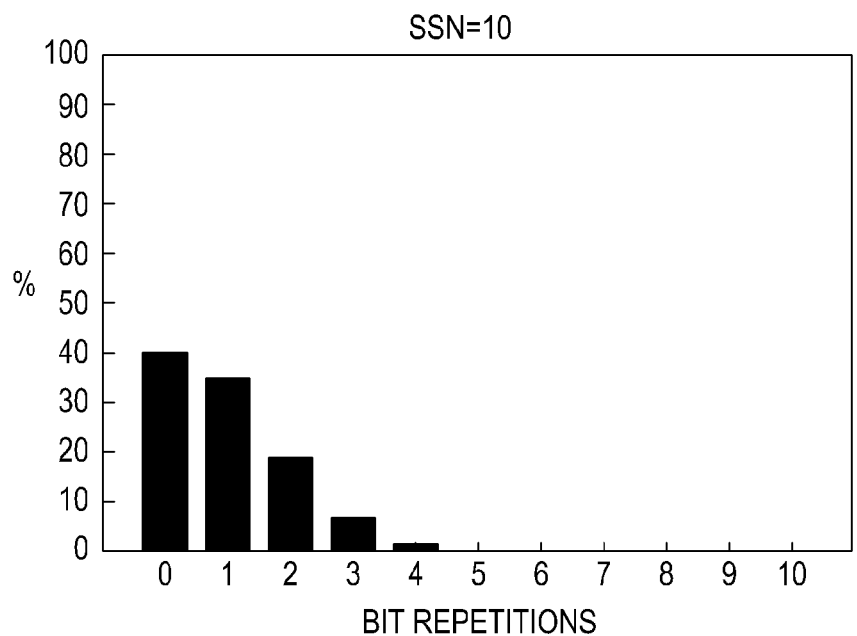

FIG. 11 illustrating distributions of bit repetitions in a randomly sampled set: (a) after receiving one set; (b) after receiving 5 consecutive sets; and (c) after receiving 10 consecutive sets (Here, N=1000, $K_0$=100). As can be seen, when a bit selection procedure is just random, even after receiving 10 packets, almost 40% of all bits are not present in the storage buffer of the receiver.

Figure 12A:
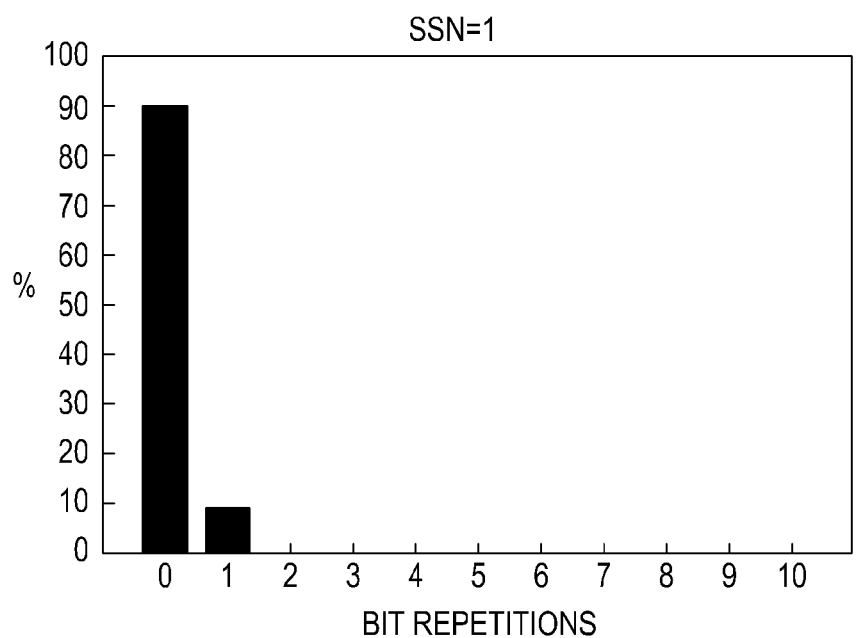
FIGS. 12A-12C are histograms illustrating distributions of bit repetitions for an embodiment of the present invention where 12A illustrates distributions after receiving one set; 12B illustrates distributions after receiving 5 consecutive sets; and 12C illustrates distributions after receiving 10 consecutive sets (Here, $N=1000$, $K_0^{(reg)}=90$, $K_0^{(rand)}=10$)
Figure 12B:
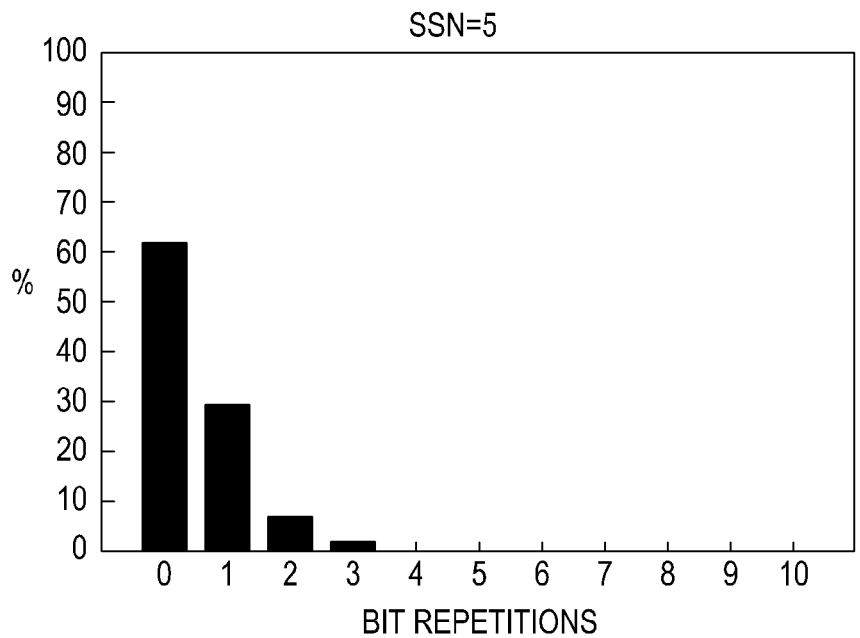
Figure 12C:
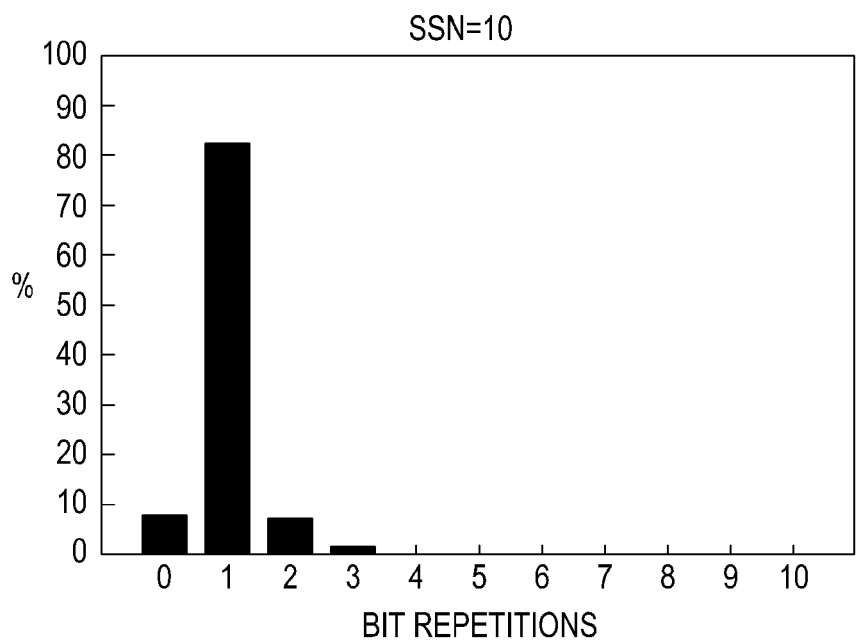

FIG. 12 illustrates distributions of bit repetitions for an embodiment of the present invention: (a) after receiving one set; (b) after receiving 5 consecutive sets; and (c) after receiving 10 consecutive sets (Here, N=1000, $K_0^{(reg)}$=90, $K_0^{(rand)}$=10).

After receiving 10 consecutive packets, more than 80% of all data bits shall be transmitted only once, with small number of omissions (~8%), and small number of repetitions (~8%). Thus, in the present invention, the receiver can quickly decode an object as long as it successfully receives several consecutive data packets (sampling sets). The number of consecutive packets required for successful object decoding depends on a signal-to-noise ratio in the communication channel. It should be noted that, when the receiver collects several non-consecutive packets, the receiver may require more packets to achieve successful decoding. Nonetheless, due to presence of the random address generator and due to periodic modification of the parameter $P_i$ of the regular address generator, at least, the performance shall not be worse than in case of purely random address generator.

Figure 13:
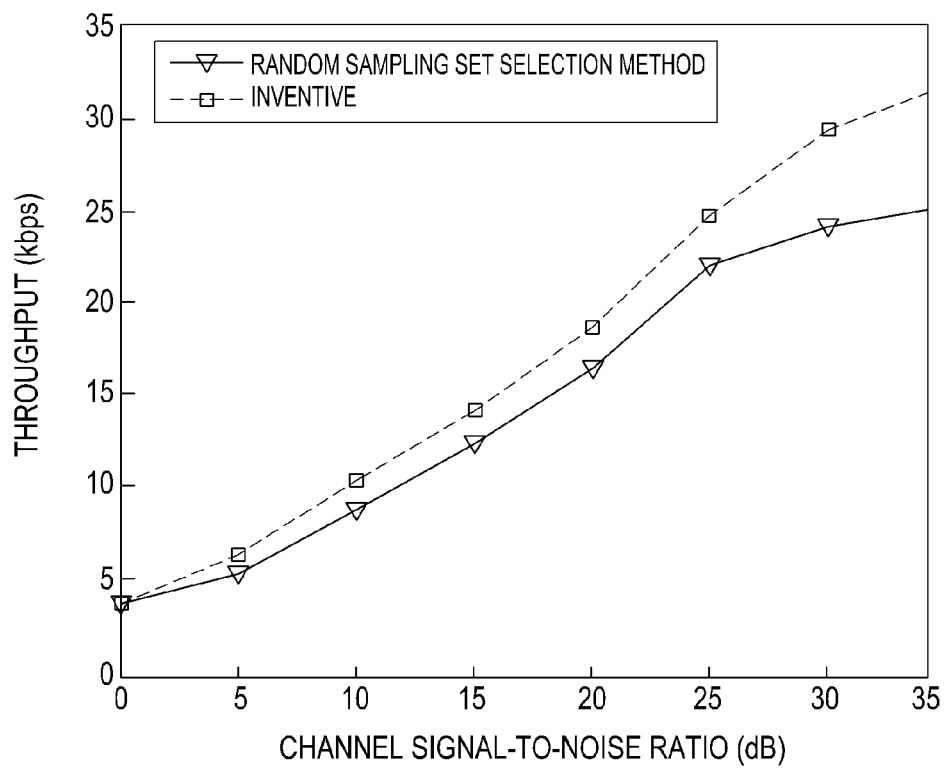
FIG. 13 is a graph comparing performances of two sampling selection methods (random and inventive).

FIG. 13 compares performances of two sampling selection methods (random and inventive).

The efficiency of the present invention has been tested in an acoustic-based connectivity system for mobile devices. FIG. 13 illustrates comparison between two methods of sampling set generation, that is, a purely random method, and a method using the present invention (it should be noted that all other system parameters are exactly the same for both systems). As one can see, in low signal-to-noise ratios (SNR ~0-5 dB), the present invention shows performance which is only marginally better than the purely random bit selection method. However, in high signal-to-noise ratios (SNR >20 dB), the present invention show significant performance advantage due to the factors described above.

The method to select sampling set bits in a unidirectional communication system described herein may be implemented in two ways:

In the first variant, the bit selection logic can be implemented by modifying address generator in FIG. 6 in accordance with Equations (1) to (6). In this case, the address generator shall consecutively produce the indexes of all $K_0^{(rand)}$ random bits from the original data segment, the indexes of all $K_0^{(reg)}$ regular bits from the original data segment, the indexes of all $K_1^{(rand)}$ random bits from the first parity segment, the indexes of all $K_1^{(reg)}$ regular bits from the first parity segment, and so on for all remaining parity segments. This method is suitable for software implementation.

Another variant is to implement parallel selection of random bits and regular bits from original segment and from each of parity segments by dedicated address generators and then combine these bits into a common sample set buffer as illustrated in FIG. 7. This method is suitable for hardware implementation and may have higher throughput due to parallel processing of bits from different segments.

The method in the present invention can be used in various wireless communication applications. It may be especially suitable for applications where a channel environment and a signal-to-noise ratio are unpredictable and may vary over a wide range. For example, this is the case for acoustic-based communication systems for mobile devices. The present method has been implemented and successfully tested in acoustic connectivity systems.

In the present invention, each of all the constituent elements (various units, generators, decoders, etc.) may designate a function block, a step (performed by a processor), and the like.

Embodiments of the present invention may be implemented in the form of hardware, software, and a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of erasability or re-recordability. It can be also appreciated that the storage device and the storage medium are embodiments of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for encoding an information object in a communication system, the method comprising the steps of:
    storing the information object in a precoder buffer;
    generating a sampling set including bits selected from the precoder buffer accordingly to a predetermined rule and bits randomly selected from the precoder buffer;
    generating control channel data including a sampling set number of the sampling set and size information for the information object; and
    modulating the sampling set and the control channel data.

2. The method of claim 1, further comprising repeating and interleaving bits of the information object, before storing the information object.

3. The method of claim 2, further comprising encoding the repeated and interleaved bits of the information object by using a predefined code, before storing the information object.

4. An encoder comprising:
    a precoder for encoding an information object and storing the encoded information object in a precoder buffer;
    a sample number/address generator for generating a sampling set number and addresses of the precoder buffer, the addresses corresponding to bits selected from a sampling set according to a predetermined rule and bits randomly selected from the sampling set;
    a multiplexer for selecting the bits of the precoder buffer, corresponding to the addresses generated by the sample number/address generator;
    a sampling set buffer for storing the sampling set output from the multiplexer;
    a control packet generator for generating control channel data including information on the sampling set number generated by the sample number/address generator and size information for the information object;
    a packet assembler for assembling the sampling set stored in the sampling set buffer with the control channel data generated by the control channel generator; and
    a modulator for modulating a packet output from the packet assembler in a predefined scheme.

5. The encoder of claim 4, wherein the sample/address generator comprises:
    a random address generator for outputting a random value; and
    a regular address generator for outputting a regular value according to the predetermined rule.

6. The encoder of claim 4, wherein the sample number/address generator comprises a sampling set number generator for generating the sampling set number for use in identification of the sampling set in a predefined cycle.

7. The encoder of claim 4, wherein the precoder comprises:
    a container packer for adding a header label to the information object and setting bits for integrity check in order to pack the information object into a standard container; and
    a repeater/interleaver for repeating and interleaving output data from the container packer.

8. The encoder of claim 7, wherein the precoder further comprises a convolution encoder for encoding data output from the repeater/interleaver and storing the encoded data in the precoder buffer.

* * * * *